United States Patent
Pigott et al.

(10) Patent No.: US 9,103,847 B2
(45) Date of Patent: Aug. 11, 2015

(54) VARIABLE RELUCTANCE SENSOR INTERFACE WITH INTEGRATION BASED ARMING THRESHOLD

(75) Inventors: John M. Pigott, Phoenix, AZ (US); Fred T. Brauchler, Canton, MI (US); William E. Edwards, Ann Arbor, MI (US); Mike R. Garrard, Jaywick (GB); Randall C. Gray, Tempe, AZ (US); John M. Hall, Chelsea, MI (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 256 days.

(21) Appl. No.: 13/564,505

(22) Filed: Aug. 1, 2012

(65) Prior Publication Data

US 2014/0035561 A1 Feb. 6, 2014

(51) Int. Cl.
*G01P 3/48* (2006.01)
*G01P 3/488* (2006.01)
(Continued)

(52) U.S. Cl.
CPC ............. *G01P 3/488* (2013.01); *G01D 5/2013* (2013.01); *G01D 5/24476* (2013.01); *G01P 3/489* (2013.01)

(58) Field of Classification Search
CPC ........... G01D 5/20; G01D 5/14; G01D 5/145; G01D 5/202; G01D 5/206; G01D 5/2225; G01D 5/2208; G01D 5/147; G01B 7/003; G01B 7/30; G01B 11/26; G01B 13/18; G01B 21/22; G01B 7/004; G01B 7/14; G01B 7/028; H02K 11/31; H02K 11/15; H02K 29/06; H02K 29/12; G01L 3/105; G01L 1/127; G01R 33/022; G01R 33/06; G01R 33/02; H01L 43/06; G01P 3/66

USPC ............ 324/207.11–207.26, 161–163, 324/166–168, 173, 174, 225, 235, 251, 324/252; 327/64, 65, 205, 261, 510, 511, 327/103, 350, 308, 117.3; 340/553, 671, 340/672, 551, 552
See application file for complete search history.

(56) References Cited

U.S. PATENT DOCUMENTS 4,131,097 A * 12/1978 Sawada et al. ........... 123/406.42
4,553,426 A * 11/1985 Capurka .................... 73/114.26
(Continued)

FOREIGN PATENT DOCUMENTS

EP 0166699 A1 5/1989
EP 0376897 A1 7/1990

OTHER PUBLICATIONS

EP Application No. 13178058.7-1558, European Search Report, mailed Jan. 24, 2014.
(Continued)

*Primary Examiner* — Huy Q Phan
*Assistant Examiner* — Thang Le
(74) *Attorney, Agent, or Firm* — Gary Stanford

(57) ABSTRACT

An interface for processing a variable reluctance sensor signal provided by a variable reluctance sensor including an integrator, an arming comparator and a detect circuit. The integrator includes an input for receiving the variable reluctance sensor signal and an output providing an integrated signal indicative of total flux change of the variable reluctance sensor. The arming comparator compares the integrated signal with a predetermined arming threshold and provides an armed signal indicative thereof. The detect circuit provides a reset signal after the armed signal is provided to reset the integrator. A corresponding method of processing the variable reluctance sensor signal is also described.

13 Claims, 3 Drawing Sheets

(51) Int. Cl.
*G01P 3/489* (2006.01)
*G01D 5/244* (2006.01)
*G01D 5/20* (2006.01)

(56) References Cited

U.S. PATENT DOCUMENTS

| | | | |
|---|---|---|---|
| 5,001,364 A | 3/1991 | Petrie et al. | |
| 5,015,878 A | 5/1991 | Lasagna et al. | |
| 5,019,722 A * | 5/1991 | Hess et al. | 327/79 |
| 5,023,527 A * | 6/1991 | Erdman et al. | 318/400.34 |
| 5,084,696 A | 1/1992 | Guscott et al. | |
| 5,451,867 A | 9/1995 | Loreck et al. | |
| 5,477,142 A | 12/1995 | Good et al. | |
| 5,710,509 A * | 1/1998 | Goto et al. | 324/207.25 |
| 6,133,728 A * | 10/2000 | Manlove et al. | 324/166 |
| 6,310,590 B1 * | 10/2001 | Havel | 345/83 |
| 6,861,817 B2 * | 3/2005 | Pigott et al. | 318/685 |
| 8,248,011 B2 * | 8/2012 | Lai et al. | 318/400.32 |
| 2008/0315865 A1 * | 12/2008 | Doogue et al. | 324/173 |
| 2010/0231202 A1 * | 9/2010 | Scheller et al. | 324/173 |

OTHER PUBLICATIONS

"Frequency to Voltage Converter." LM2907/LM2917 National Semiconductor. DS007942 May 2003 pp. 1-21.

"Variable Reluctance Sensor Interfaces with Differential Input and Adaptive Peak Threshold." Maxim Integrated Products. pp. 1-23 19-4283; Rev.3; Mar. 2011 MAX9924-MAX9927.

* cited by examiner

VARIABLE RELUCTANCE SENSOR INTERFACE WITH INTEGRATION BASED ARMING THRESHOLD

BACKGROUND OF THE INVENTION

1. Field of the Invention

The present invention relates generally to variable reluctance sensors, and more particularly to a variable reluctance sensor interface with an integration based arming threshold.

2. Description of the Related Art

A variable reluctance (VR) sensor is used to measure the angular position and speed of a moving or rotating ferromagnetic object. One such application is the crankshaft of an automobile. For example, a toothed ferrous (iron based) wheel is mounted to the crankshaft and the VR sensor is used to sense each passing tooth during rotation of the crankshaft. The crankshaft position and top dead center (TDC) are used to set engine timing for electronic engine control including ignition and fuel injection timing and the like. The TDC is usually established relative to a missing tooth of the wheel. The VR sensor typically includes a coil and biasing magnet positioned near the toothed wheel, in which each tooth passing by the VR sensor changes the magnetic flux which is converted to an electrical voltage induced in the coil. A VR sensor (VRS) interface senses and conditions the electrical signal to derive timing parameters. In this manner, the rotating motion of the crankshaft is converted to an electronic signal which is used to determine the position and speed of the crankshaft. The zero crossings of the voltage from the VR sensor indicate known positions of the rotating wheel.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Determining position accurately using the electrical signal from the VR sensor is made more difficult with various physical properties of the electro-mechanical systems, such as synchronous and asynchronous noise, the dynamic range of the input signal, and signal variations caused by aging and mechanical tolerances, such as tooth variations, relative placement between the VR sensor and tooth placement, etc. The output signal of the VR sensor may include various types of noise, such as white noise, random or asynchronous noise, correlated or synchronous noise, noise bursts, ripple noise riding on top of the input, etc. The VRS signal is thus associated with a signal to noise ratio (SNR) parameter. To minimize the possibility of incorrect determination of zero crossing events, it is desirable to only allow the zero crossing detector to be enabled when the sensor is known to be already close to the zero crossing position. Allowing the zero crossing detector to be enabled is termed 'arming' the detector. As described herein, the sensor signal is integrated and compared with a predetermined arming threshold. It has been determined that the optimal arming threshold should vary with speed to ensure a sufficient level of SNR for proper detection. The comparison of the integrated signal with the predetermined arming threshold effectively reduces the probability of falsely detecting or otherwise missing a zero crossing.

Figure 1:
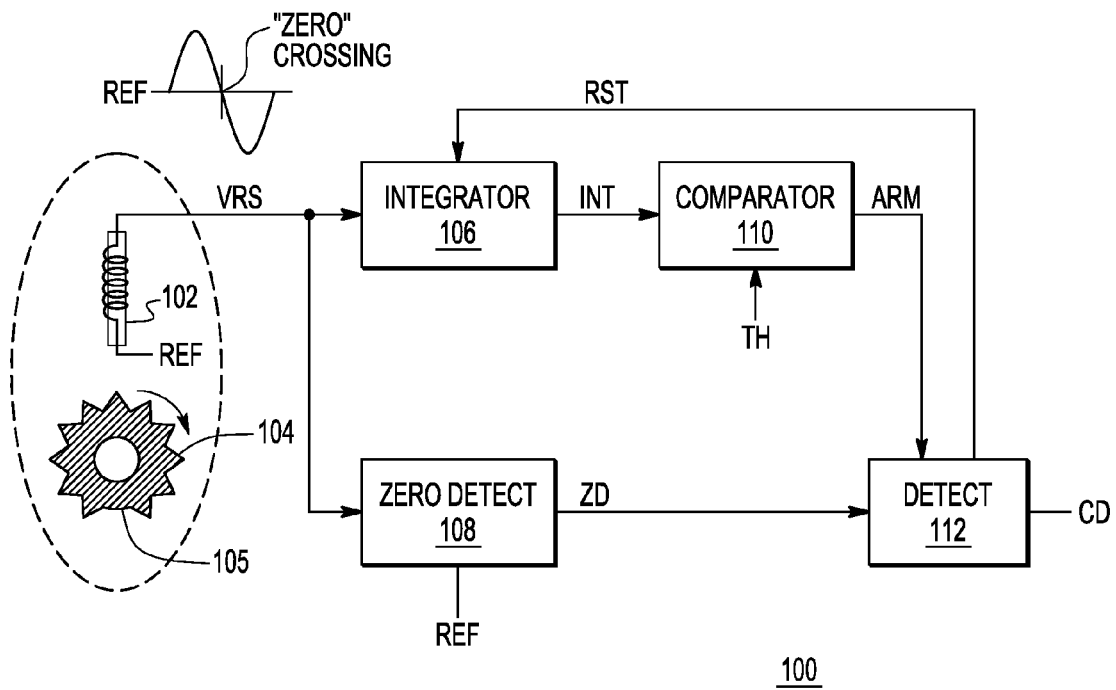
FIG. 1 is a simplified schematic and block diagram of a VRS interface with an integration based arming threshold implemented according to one embodiment for interfacing a VR sensor.

FIG. 1 is a simplified block diagram of a VRS interface 100 with an integration based arming threshold implemented according to one embodiment for interfacing a VR sensor 102. In the illustrated configuration, the VR sensor 102 includes a coil and biasing magnet which is orthogonally positioned relative to a trigger wheel mounted to a crankshaft (not shown) or other rotating member. The trigger wheel may be made in any one of many different ways. In this illustrated configuration, the trigger wheel is configured as a toothed wheel 104 in which the VR sensor 102 senses each passing tooth. As the toothed wheel 104 rotates, each passing tooth changes the magnetic flux of the biasing magnet through the coil, and the coil converts the changing magnetic flux to an electrical signal VRS.

The form of the electrical signal VRS is illustrated herein in the approximate form of a sinusoidal waveform with a positive pulse followed by a negative pulse with an intermediate "zero" crossing point. The actual shape and form of the VRS signal depends on various system parameters, such as the shape and configuration of the teeth, position and orientation of the VR sensor 102, etc., and is not limited to a sinusoidal form. The coil, and thus the VRS signal, is referenced to a reference voltage level REF. REF may be any suitable positive, negative or ground (e.g., 0 volts) voltage level. The zero crossing point occurs when the VRS signal crosses REF between the positive and negative pulses.

The VRS signal is provided to the input of an integrator circuit 106 and to the input of a zero detect circuit 108. The integrator circuit 106 receives a reset signal RST and provides an integrated signal INT to an input of a comparator circuit 110. The comparator circuit 110 compares INT with a threshold value TH and provides an armed signal ARM to one input of a detect circuit 112. The zero detect circuit 108 compares VRS with REF and provides a zero detect signal ZD to another input of the detect circuit 112. The detect circuit outputs a cross detect signal CD and the reset signal RST.

In operation, the integrator circuit 106 integrates the VRS signal and provides the integrated signal INT. The comparator circuit 110 asserts or otherwise provides ARM when INT crosses the predetermined threshold value TH. TH may be determined experimentally depending upon the particular implementation and is selected to be at a level which coincides with a sufficient "area" of the VRS signal before the zero crossing point as indicated by the INT signal. ARM is provided to indicate an armed condition to the detect circuit 112. The zero detect circuit 108 asserts or otherwise provides ZD when VRS reaches or falls below REF indicating the zero crossing point. The detect circuit 112 provides CD to indicate the zero crossing point after ARM has been provided indicating an armed condition. The detect circuit 112 provides the RST signal to reset the integrator circuit 106 and thus clear INT any time after the ARM signal has been provided up to just before onset of the next pulse depending upon the configuration. In one embodiment, RST is provided in response to CD indicating the zero crossing point.

In summary, for each timing event initiated by a tooth of the wheel 104, ARM is provided upon onset of a positive pulse and the detect circuit 112 determines the zero crossing point and provides CD when ZD is provided after ARM has been provided during each cycle. ZD, and thus CD, indicates when the tooth is generally aligned or centered with respect to the VR sensor 102. The integrator circuit 106 is reset and INT is cleared after the armed condition is indicated by the ARM signal and in time to ensure detection of the next pulse of VRS in the following cycle. The ARM signal may be cleared any time after being provided and before the next pulse of VRS.

Figure 2:
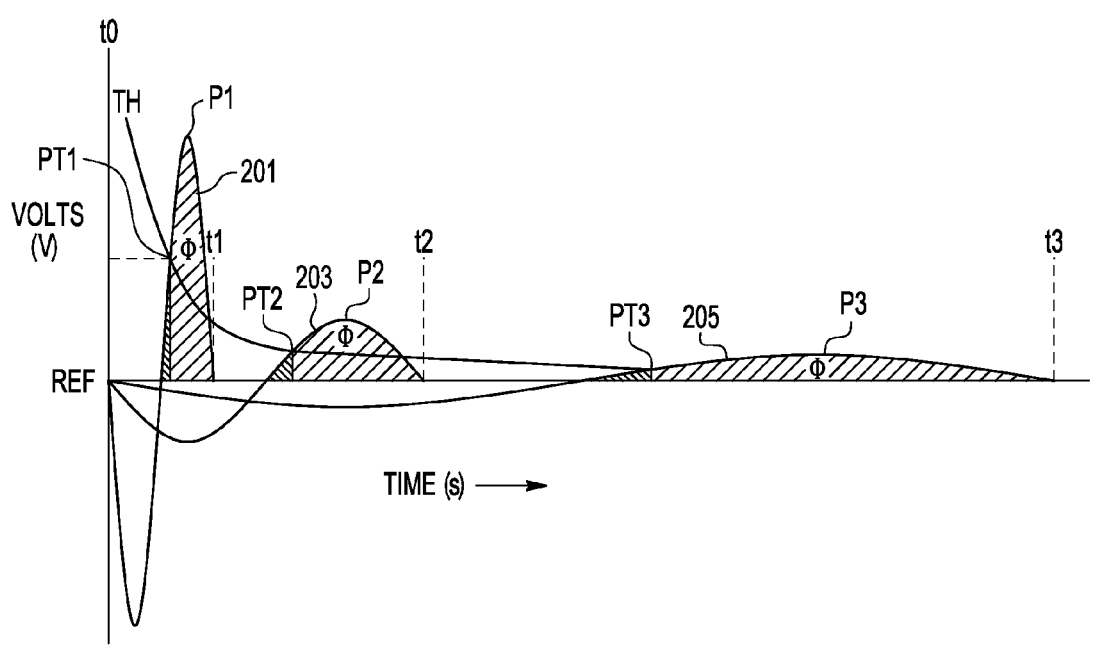
FIG. 2 is a timing diagram of three exemplary VRS signal curves plotted versus time illustrating the relationship between duration and peak magnitude of corresponding VRS pulse signals for different rotational speeds.

FIG. 2 is a timing diagram of the voltage of three exemplary VRS signal curves 201, 203 and 205 plotted versus time illustrating the relationship between duration and peak magnitude of corresponding VRS pulse signals for different rotational speeds. Each VRS signal curve is illustrated as in the approximate form of a sinusoidal pulse at a corresponding one of different rotation speeds beginning at a common initial time t0 and referenced relative to REF. Also, each pulse is shown inverted initially going negative and then positive for purposes of illustration.

The pulses generated by the VR sensor 102 are generated in response to the change of magnetic flux caused by each passing tooth. The peak amplitude or magnitude of each pulse varies with the rate at which a tooth passes by the VR sensor 102, in which the rate may be measured in revolutions per minute (RPM) of the rotating toothed wheel 105. Because the electromotive force (emf) generated by the VR sensor 102 depends on the change of the magnetic flux with time, or d(flux)/dt, the peak magnitude of the pulse signal depends on the speed. The duration or period of each VRS pulse also changes with speed, in which the period of the pulse is shorter at a higher speed. Thus, the pulses of VRS have greater peaks which occur sooner and with greater frequency at higher speeds, and the pulses have smaller peaks which occur later and with less frequency at lower speeds.

As shown, the first VRS signal curve 201 represents a higher speed in which it reaches a relatively high peak level P1 and then falls back to REF after a relatively short time t1−t0. The second VRS signal curve 203 represents an intermediate speed in which it reaches an intermediate peak level P2 and then falls back to REF after an intermediate time t2−t0. The third VRS signal curve 205 represents a slower speed in which it reaches a relatively low peak level P3 and then falls back to REF after a relatively long time t3−0. In summary, the peak magnitudes decrease with decreasing speed (P1>P2>P3) whereas the duration of the pulses increase with decreasing speed (t1−t0<t2−t0<t3−t0).

The "area" Φ of the positive pulses of the VRS signal curves 201, 203 and 205 relative to REF are shaded in which each area has the dimension of Volts·time (V·s) where "s" denotes time in seconds. The area Φ of the positive pulses of the VRS signal curves 201, 203 and 205 relative to REF are approximately equal. The integrator circuit 106 of the VRS interface 100 integrates the emf pulses generated by the VR sensor 102 thus determining the change in magnetic flux coupled through it. The comparator circuit 110 compares the integrated signal INT with the predetermined threshold value TH, which represents a predetermined flux change. The predetermined flux change represented by TH serves as a good arming threshold for the circuit which is relatively independent of the speed of rotation.

A threshold curve TH is shown intersecting each of the VRS signal curves 201, 203 and 205 at corresponding intersecting points representing the predetermined flux change indicated by each pulse. As shown, TH intersects the VRS signal curves 201, 203 and 205 at points PT1, PT2 and PT3, respectively. The blackened area of each positive pulse between onset of the pulse and intersection of TH represents the predetermined flux change indicated by TH relative to the total flux change indicated by the entire positive pulse. The blackened areas for each of the pulses have approximately the same area and thus represent about the same predetermined percentage of the total flux change represented by each pulse. Since TH is compared with INT which is the integrated versions of the VRS pulses, TH is a fixed value and provides a suitable arming threshold independent of the speed of rotation.

Figure 3:
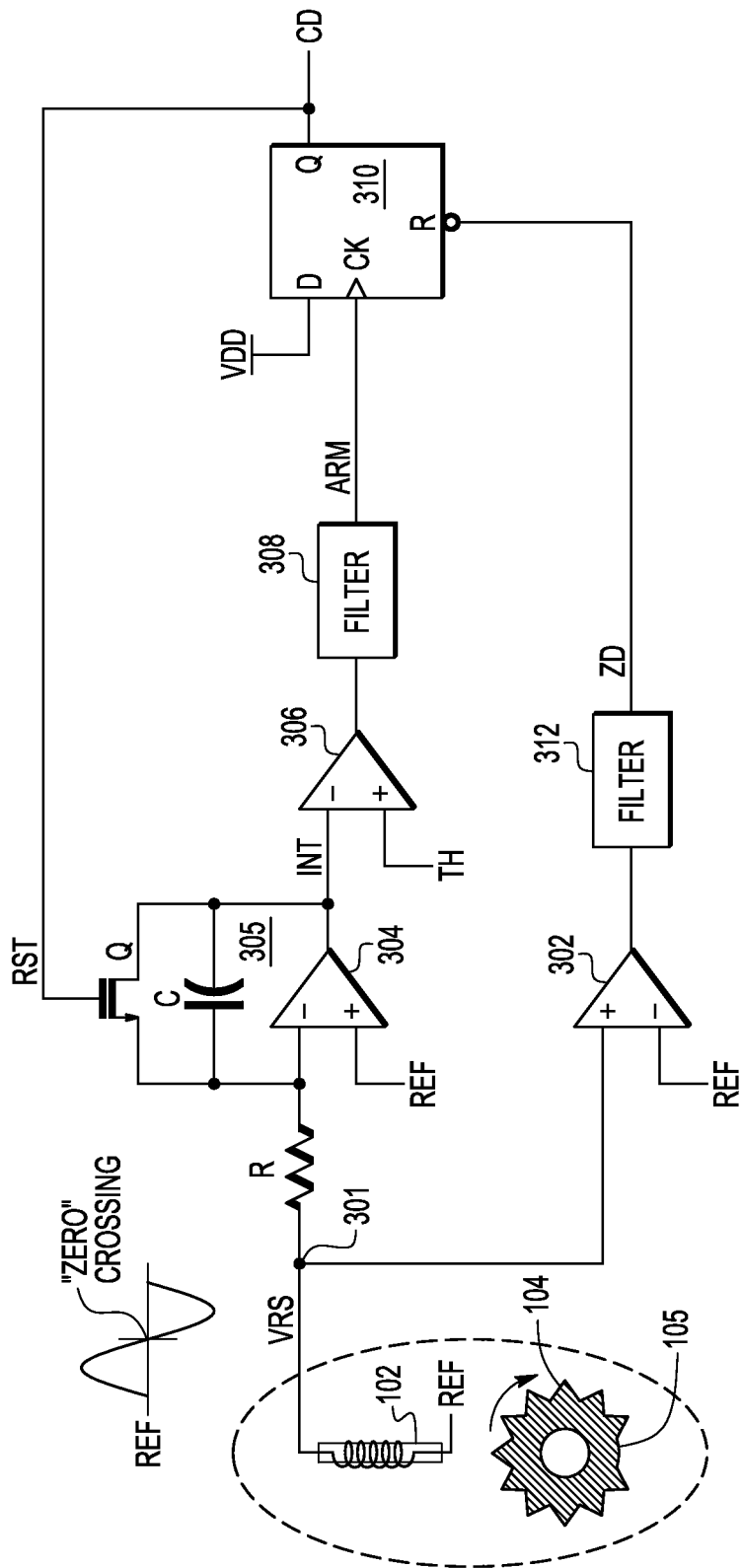
FIG. 3 is a simplified schematic and block diagram of a VRS interface with an integration based arming threshold implemented according to a more specific embodiment for interfacing the VR sensor.

FIG. 3 is a more detailed schematic and block diagram of a VRS interface 300 implemented with an integration based arming threshold according to a more specific embodiment for interfacing the VR sensor 102. A node 301 providing VRS is coupled to one end of a resistor R and to the non-inverting or positive (+) input of a detect comparator 302 having an inverting or negative (−) input receiving REF. The other end of resistor R is coupled to the negative input of an amplifier 304 having its positive input receiving REF. A capacitor C is coupled between the negative input and the output of the amplifier 304, in which the amplifier 304 is configured as an inverting integrator 305. The output of the integrator 305 provides the integrated signal INT to the negative input of a comparator 306, which receives TH at its positive input.

The output of the comparator 306 is provided to an input of a filter 308, which has an output providing the ARM signal to a clock input of a D-type latch or flip-flop (DFF) 310. The filter 308 generally filters or otherwise conditions the ARM signal to remove noise and/or signal spikes which might otherwise disrupt operation. The D-input of the DFF 310 receives a source voltage VDD and its Q output provides the CD signal. The output of the detect comparator 302 is provided to an input of a filter 312, which has an output providing the ZD signal to an inverted reset input of the DFF 310. The filter 312 operates in a similar manner as filter 308 and generally filters or otherwise conditions the ZD signal to remove noise and/or signal spikes which might otherwise disrupt operation.

The CD signal is used as the reset signal RST provided to the control input or gate of an electronic switch Q shown as an N-type field-effect transistor (FET) or metal-oxide semiconductor (MOS) transistor or the like. As shown, the drain of Q is coupled to the output of the amplifier 304 and its source is coupled to the inverting input of the amplifier 304. When CD is low, Q is turned off. When CD is high, Q is turned on to effectively short the capacitor C and thus reset the integrator 305 as further described herein.

Figure 4:
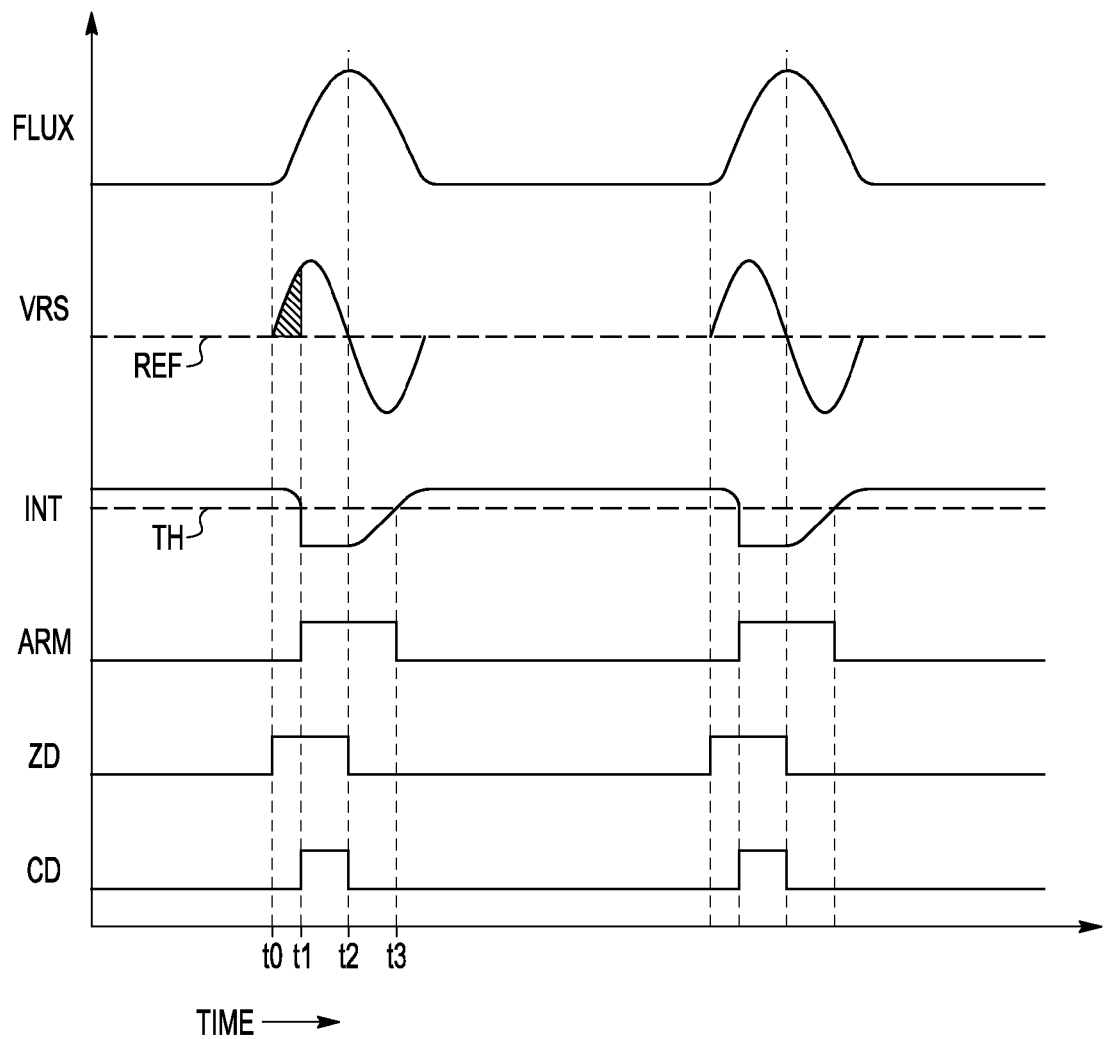
FIG. 4 is a timing diagram illustrating operation of the VRS interface of FIG. 3.

FIG. 4 is a timing diagram illustrating operation of the VRS interface 300, in which signals FLUX, VRS, INT, ARM, ZD, and CD are plotted versus time. FLUX shows the change of magnetic flux of the VR sensor 102 in response to passing teeth during rotation for the illustrated embodiment. The VRS signal is shown as a pulse signal including a positive pulse closely followed by a negative pulse approximately centered at the reference voltage level REF indicative of the rate of change of FLUX. The shape of the pulse signal is shown as an approximate sinusoidal pulse for purposes of illustration. The actual shape of FLUX signal and the corresponding shape of the positive and negative pulses on VRS, however, varies with different configurations and is not necessarily sinusoidal.

Each pulse of VRS increases above REF as a tooth edge approaches the VR sensor 102 until it reaches a peak magnitude indicative of maximum magnetic flux change when the tooth edge is almost aligned with the VR sensor 102. Each pulse of VRS then decreases and intersects REF at a maximum flux level when the tooth is aligned with the VR sensor 102, and then falls below REF as the tooth begins to retreat from the VR sensor 102 reaching a negative peak. The pulse eventually returns to REF when the tooth has passed. The next tooth generates similar positive and negative pulses relative to REF after any dead-time period between consecutive teeth.

At an initial time t0, FLUX and VRS start increasing indicating an approaching tooth. INT is charged high from a prior cycle. ARM, ZD and CD are initially low prior to t0, and the detect comparator 302 asserts ZD high at about time t0. As VRS rises, the inverting integrator 305 integrates VRS and INT decreases. At about time t1, INT reaches or otherwise falls below TH and the comparator 306 asserts ARM high. When ARM goes high, DFF 310 is clocked to that it asserts CD high at about time t1. CD going high turns on switch Q shorting the capacitor C thus resetting the integrator 305, so that the amplifier 304 clears the INT signal low. The VRS interface 300 is placed in an armed condition.

VRS reaches a peak and decreases until it passes back through REF at about time t2 indicating alignment of the tooth at the maximum level of FLUX. The detect comparator 302 asserts ZD low at time t2 which resets the DFF 310 pulling CD back low. The switch Q is turned back off so that the integrator 305 begins integrating VRS once again. Thus, INT rises as it integrates the negative pulse of VRS and INT rises back above TH at about time t3. The comparator 306 clears ARM back low at about time t3, and INT reaches a maximum level as the negative pulse of VRS completes and returns to REF. Operation repeats in substantially similar manner for each cycle in response to a passing tooth.

The VRS interface 300 uses the CD signal to reset the integrator 305 and clear the INT signal. The integrator 305 remains reset while CD is high and resumes the integrating function when CD is pulled low. In this case, it is desired to integrate the negative pulse of VRS to pull INT back high above TH for the next cycle, so that the integrator 305 is released from the reset condition at or before the zero crossing point at time t2. Also, INT rising back above TH clears ARM in this configuration.

An interface for processing a variable reluctance sensor signal provided by a variable reluctance sensor according to one embodiment includes an integrator, an arming comparator and a detect circuit. The integrator includes an input for receiving the variable reluctance sensor signal and an output providing an integrated signal indicative of total flux change of the variable reluctance sensor. The arming comparator compares the integrated signal with a predetermined arming threshold and provides an armed signal indicative thereof. The detect circuit provides a reset signal after the armed signal is provided to reset the integrator.

A method of processing a variable reluctance sensor signal provided by a variable reluctance sensor according to one embodiment includes integrating the variable reluctance sensor signal and providing a corresponding integrated signal indicative of a total flux change of the variable reluctance sensor, comparing the integrated signal with a predetermined arming threshold and providing a corresponding armed signal, and clearing the integrated signal after the armed signal is provided.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An interface for processing a variable reluctance sensor signal provided by a variable reluctance sensor, comprising:
   an integrator including an input for receiving the variable reluctance sensor signal and including an output providing an integrated signal which is indicative of total flux change of the variable reluctance sensor;
   an arming comparator which compares said integrated signal with a predetermined arming threshold and which provides an armed signal indicative thereof;
   a detect circuit which receives said armed signal and which provides a reset signal to reset said integrator after said armed signal is provided;
   a detect comparator that compares the variable reluctance sensor signal with a reference signal and that provides a zero detect signal indicative thereof; and
   wherein said detect circuit provides a crossing signal when said zero detect signal is provided after said armed signal indicates an armed condition.

2. The interface of claim 1, wherein said integrator comprises an amplifier with a feedback capacitor, further comprising a switch coupled to discharge said capacitor in response to said reset signal.

3. The interface of claim 1, wherein said predetermined arming threshold has a value sufficient to minimize false arming.

4. The interface of claim 1, wherein said crossing signal is used as said reset signal.

5. The interface of claim 1, wherein said detect circuit provides said reset signal at a selected time after said armed signal is provided and before a subsequent pulse of the variable reluctance sensor signal.

6. The interface of claim 1, wherein said arming comparator clears the armed signal before onset of a subsequent pulse of the variable reluctance sensor signal.

7. The interface of claim 1, wherein:
   said integrator comprises:
      a resistor including a first end coupled to a node receiving the variable reluctance sensor signal and including a second end;
      a capacitor; and
      an amplifier including a first input coupled to said second end of said resistor and to a first end of said capacitor, including a second input receiving a reference signal, and including an output coupled to a second end of said capacitor and providing said integrated signal; and
   wherein said arming comparator includes a first input receiving said integrated signal, includes a second input receiving said predetermined arming threshold, and includes an output providing said armed signal.

8. The interface of claim 7, further comprising:
a transistor including first and second current terminals coupled to said first and second ends of said capacitor, respectively, and including a control terminal; and
wherein said detect circuit comprises a latch including a clock input receiving said armed signal, including a data input receiving a logic one signal, and including an output providing a crossing signal to said control terminal of said transistor.

9. The interface of claim 8, further comprising a detect comparator including a first input for receiving the variable reluctance sensor signal, including a second input receiving said reference signal, and including an output providing a detect signal to an inverting reset input of said latch.

10. The interface of claim 9, further comprising at least one filter for filtering at least one of said armed signal and said detect signal.

11. An interface for processing a variable reluctance sensor signal provided by a variable reluctance sensor, comprising:
an integrator including an input for receiving the variable reluctance sensor signal and including an output providing an integrated signal which is indicative of total flux change of the variable reluctance sensor, wherein said integrator comprises:
a resistor including a first end coupled to a node receiving the variable reluctance sensor signal and including a second end;
a capacitor; and
an amplifier including a first input coupled to said second end of said resistor and to a first end of said capacitor, including a second input receiving a reference signal, and including an output coupled to a second end of said capacitor and providing said integrated signal;

an arming comparator which compares said integrated signal with a predetermined arming threshold and which provides an armed signal indicative thereof, wherein said arming comparator includes a first input receiving said integrated signal, includes a second input receiving said predetermined arming threshold, and includes an output providing said armed signal;

a transistor including first and second current terminals coupled to said first and second ends of said capacitor, respectively, and including a control terminal; and a detect circuit which receives said armed signal and which provides a reset signal to reset said integrator after said armed signal is provided, wherein said detect circuit comprises a latch including a clock input receiving said armed signal, including a data input receiving a logic one signal, and including an output providing a crossing signal to said control terminal of said transistor.

12. The interface of claim 11, further comprising a detect comparator including a first input for receiving the variable reluctance sensor signal, including a second input receiving said reference signal, and including an output providing a detect signal to an inverting reset input of said latch.

13. The interface of claim 12, further comprising at least one filter for filtering at least one of said armed signal and said detect signal.

* * * * *